United States Patent [19]

Brandt et al.

[11] 4,154,802
[45] May 15, 1979

[54] UPGRADING OF MAGNESIUM CONTAINING MATERIALS

[76] Inventors: Peter J. Brandt, 9, Verdi Ave., Risidale, Johannesburg; John H. Selby, 12 Zaymel Gardens, Duchess Ave., Windsor Park, Randburg, both of South Africa, 2001

[21] Appl. No.: 804,154

[22] Filed: Jun. 6, 1977

[30] Foreign Application Priority Data

Jun. 9, 1976 [ZA] South Africa .................. 76/3419

[51] Int. Cl.² ............................................. C01F 5/02
[52] U.S. Cl. .................................... 423/173; 423/519
[58] Field of Search ..................... 423/169, 173, 519

[56] References Cited

U.S. PATENT DOCUMENTS

| 3,428,420 | 2/1969 | Douglas et al. | 423/519 |
| 3,542,511 | 11/1970 | Shah | 423/519 |
| 3,622,270 | 11/1971 | Shah | 423/519 |
| 3,679,362 | 7/1972 | Hartmann et al. | 423/169 |

FOREIGN PATENT DOCUMENTS 741871 3/1974 South Africa.

Primary Examiner—O. R. Vertiz
Assistant Examiner—Wayne A. Langel
Attorney, Agent, or Firm—Young & Thompson

[57] ABSTRACT

This invention is concerned with the recovery of relatively pure magnesia from magnesite which is normally contaminated with too much silica and silicates to permit the magnesite simply to be calcined for the recovery of refractory grade magnesia. The magnesite in its raw uncalcined state is treated with $SO_2$ at elevated temperatures preferably between 50° and 60° C. thereby rapidly dissolving a high proportion of magnesium as bisulphite without the cost of initial calcination and without dissolving above about 1% of $SiO_2$ present in the magnesite. The solution of magnesium bisulphite can thus be purified by filtration and magnesia may be recovered in known manner from the purified solution.

6 Claims, 5 Drawing Figures

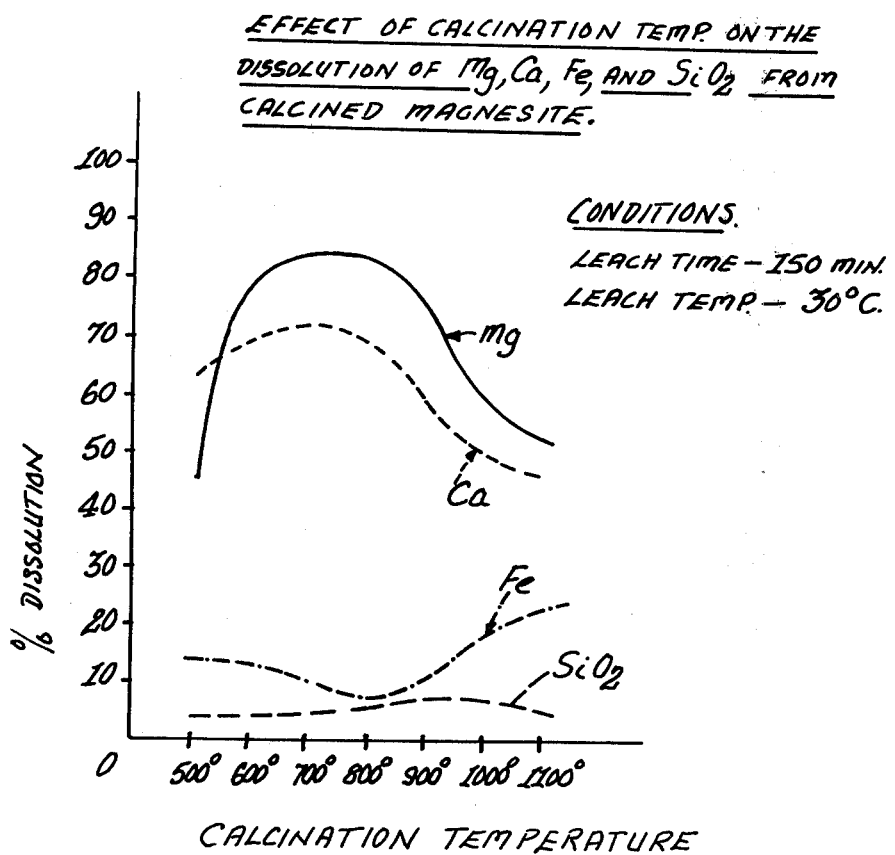

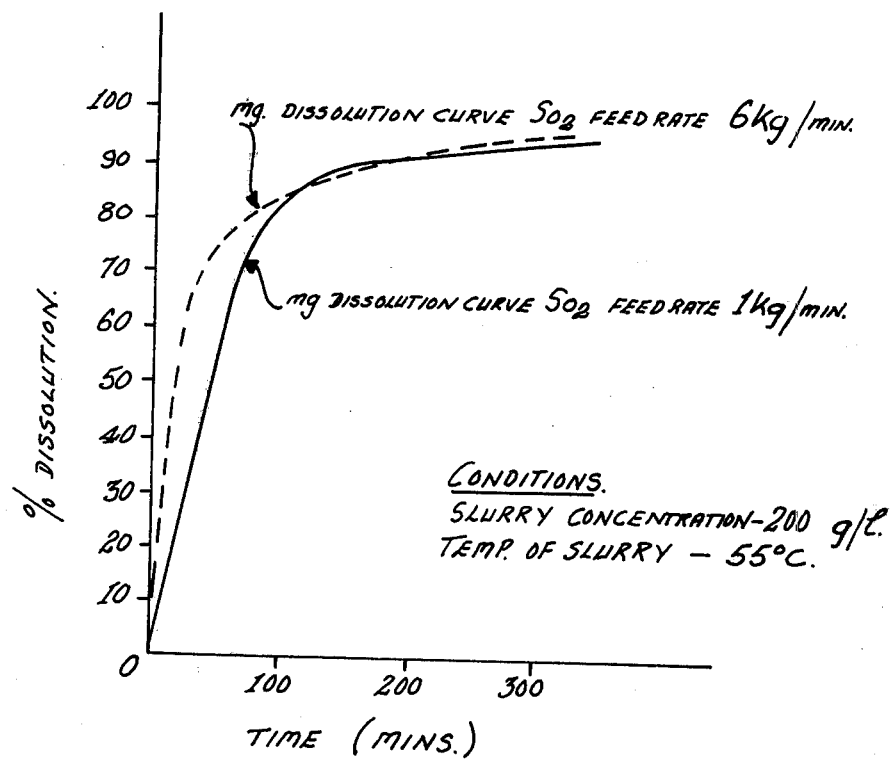

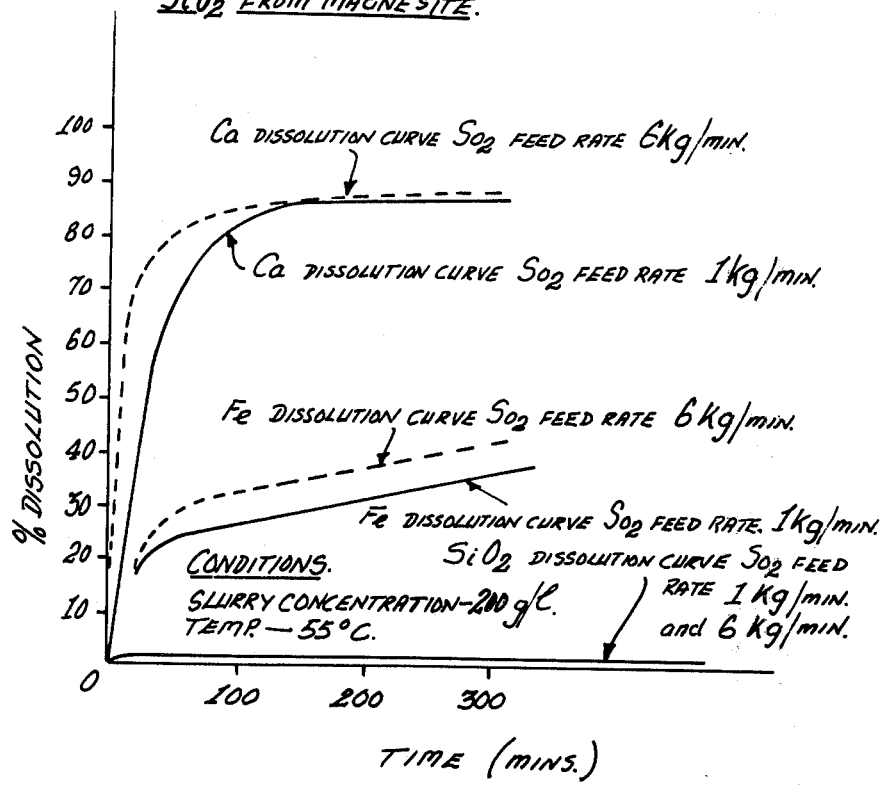

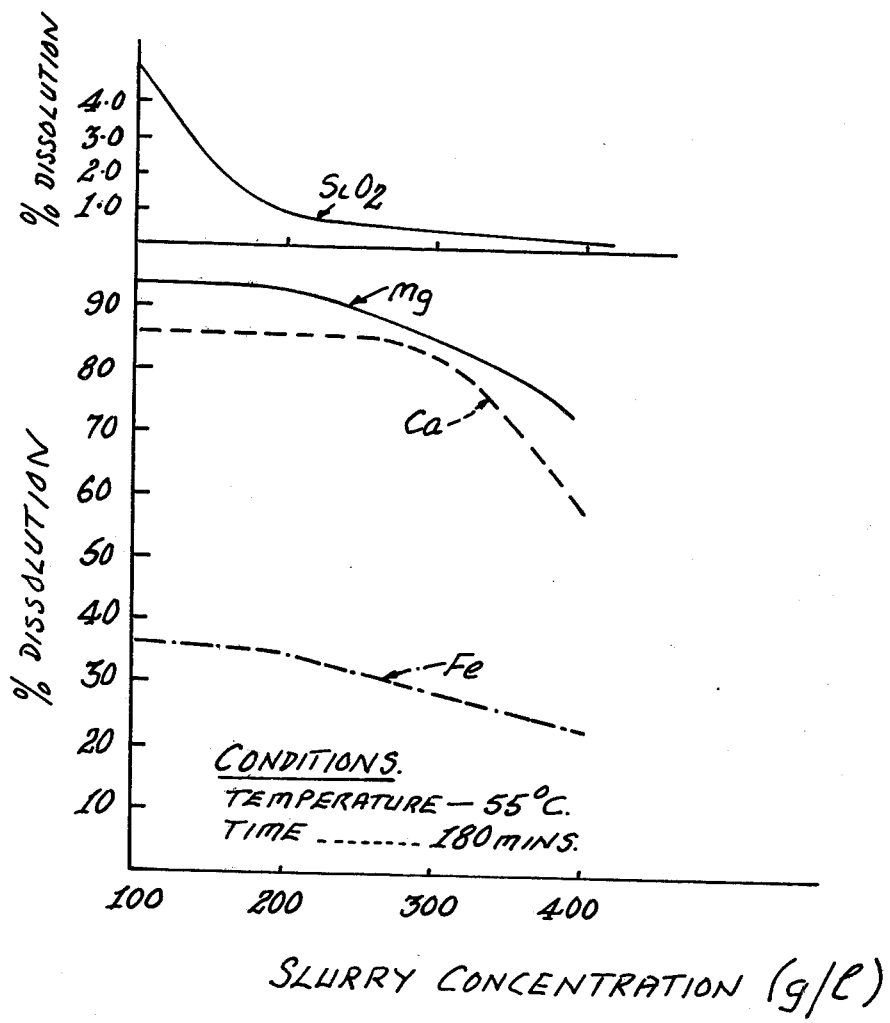

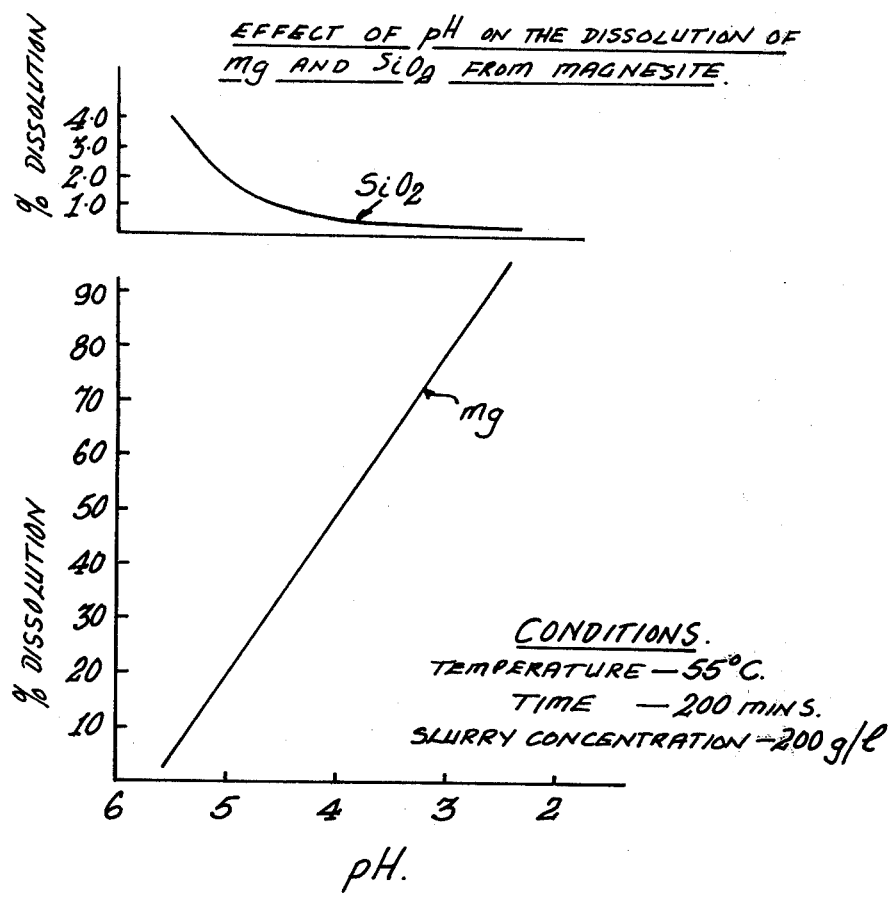

UPGRADING OF MAGNESIUM CONTAINING MATERIALS

This invention relates to the upgrading of sources of magnesium. More particularly the invention is concerned with the production of magnesia suitable for further chemical processing and of high purity and/or high grade refractory magnesia from sources of magnesium which are generally contaminated to such an extent as to be unacceptable for production of refractories.

Magnesite and dolomite occur widely in nature but many deposits are contaminated with silicates and other impurities which are difficult to remove to such an extent that beneficiation of the ore has to be undertaken before an acceptable grade of magnesia can be obtained by further processing.

It has been proposed to solubilize raw magnesite and other magnesium containing materials by calcination followed by reaction of an aqueous slurry of the calcined material with sulphur dioxide to form soluble magnesium bisulphite. The solution is then filtered to remove insoluble impurities and relatively pure magnesium sulphite is precipitated by removal of sulphur dioxide from the bisulphite for example by raising the temperature of the solution to 90° C. Magnesium oxide is then recovered by heating the sulphite to drive off sulphur dioxide.

Calcination of the magnesium containing material represents a substantial proportion of the overall cost of the above bisulphite purification route but attempts to react the uncalcined material with sulphur dioxide have not been successful as too low a recovery is achieved.

Furthermore calcination of magnesite has a marked effect upon the reaction of a slurry of the calcined material with $SO_2$ at temperatures as low as 30° C. As may be seen from FIG. 1 hereof not only Mg and Ca but also $SiO_2$ dissolve in increasing proportion with increased calcination temperatures.

U.S. Pat. No. 3,679,362 describes the bisulphite route for recovery of pure MgO from crude magnesite without prior calcination by reaction of a slurry of the crude magnesite with $SO_2$ at room temperatures but in this case sulphate ions are required to be present during the reaction with $SO_2$ and this may be responsible, at least in part, for a relatively high sulphate content in the MgO product. The sulphate ions can only be decomposed by calcination of the magnesium sulphite at temperatures as high as 1170° C. In South African patent no. 74/1871 it has been proposed to limit sulphate formation by a flash decomposition of the magnesium sulphite at a temperature of the order of 600° C. While such flash decomposition limits sulphate formation during the calcination stage, it cannot decompose sulphate ions already present if the decomposition temperature is below 1170° C.

It is an object of the invention to provide a process for the solubilization of uncalcined magnesium containing materials in the recovery of magnesia therefrom via the bisulphite purification route.

It is a further object of the invention to provide for reduced contamination of magnesia by $SiO_2$ where such magnesia is produced via the bisulphite route.

According to the invention a method of recovering magnesia from magnesium carbonate containing raw material includes the steps of forming a slurry of uncalcined raw material, heating the slurry to a temperature between 40° and 90° C., treating the slurry with sulphur dioxide to form soluble magnesium bisulphite, separating undissolved impurities from the solution of magnesium bisulphite, precipitating magnesium sulphite from the solution, separating the precipitate from the mother liquor and recovering magnesia from the separated precipitate.

It is surprising that magnesium bisulphite should be formed at temperatures between 40° and 90° C., and more especially at the preferred temperatures of 55° to 65° C., because one procedure for forming the magnesium sulphite precipitate comprises heating the filtered bisulphite solution to approximately 90° C. in order to drive off sulphur dioxide. It has been found, however, that maintaining the hot slurry at saturation level with respect to sulphur dioxide drives the reaction towards formation of the soluble bisulphite. By heating the slurry to the preferred temperature range of 55° to 65° C. the rate of solubilization of magnesium bisulphite is so increased that uncalcined magnesite can be treated thereby reducing the cost of the bisulphite route for magnesia production without adversely affecting the rate of reaction.

It has also been found, quite surprisingly, that by avoiding calcination of the magnesite treated in the process of the invention, the quantity of $SiO_2$ dissolved is materially reduced. Thus as may be seen from FIG. 1 at calcination temperature of about 600° C. as much as 4% of $SiO_2$ is dissolved, while at calcination temperature of the order of 1000° C. 8% of the $SiO_2$ present may go into solution. During the reaction according to the invention only a small proportion of 1% or less of silica and silicate compounds, which may be present in the raw material, are solubilized so that an effective purification of the magnesium compounds in solution is obtained after filtration, centrifuging or other manner of separation of the undissolved solids. It has been found in particular that solubilization of silica and silicates is maintained at a satisfactorily low level if the concentration of the slurry of uncalcined magnesite is such as to provide at least 24 g/l of magnesium, best results being achieved at a magnesium content in the slurry of approximately 48 g/l. Too great a concentration of the slurry with respect to its magnesium content may give rise to premature precipitation of magnesium compounds and the practical upper limit has been found to be around 72 g/l of magnesium. Referring to FIG. 4 it will be seen that at a slurry concentration of 100 g/l, corresponding to 24 g/l of Mg and a leach temperature of 55° C. and time of 180 minutes, almost 95% of the Mg is dissolved by reaction of the slurry with $SO_2$ while about 5% of $SiO_2$ dissolves. The proportion of Mg dissolution remains at about 95% with increase in slurry concentration to 200 g/l i.e. 48 g/l of Mg, while the dissolution of $SiO_2$ drops significantly to below 1%.

It is theoretically possible to mix the slurry directly with sulphurous acid but in practical embodiments of the invention sulphur dioxide is injected into the hot slurry to form the soluble magnesium bisulphite. The $SO_2$ treatment of the hot slurry should be continued until a pH level of 2.5 is achieved. Below a pH of 2.0 $SO_2$ is merely being added in excess while at pH of more than 5.0 silica and silicates tend to dissolve. As shown in FIG. 5 a slurry containing 200 g/l of raw magnesite corresponding to 48 g/l of Mg is treated with $SO_2$ gas and with decreasing pH the Mg dissolution rises and $SiO_2$ dissolution drops.

The feed rate of $SO_2$ into the hot slurry is also a material factor in achieving an economical rate of solubilization of magnesium from raw magnesite. The rate of such solubilization increases rapidly with an increase in $SO_2$ feed rate up to an overall dissolution of about 85% of the magnesium in the slurry. Thereafter the rate of reaction of the magnesium decreases materially. It has been found that the optimum dissolution of magnesium is achieved in a period of approximately 120 minutes and that even an increase in $SO_2$ flow rate will not shorten this period. Thus it has been found that the most economical $SO_2$ flow rate is one providing a stoichiometric equivalent of $SO_2$ relative to the total magnesium content of the raw material, in 60 to 200 minutes and more specifically in 100 to 120 minutes. Since about 85% of the raw magnesite enters into reaction with $SO_2$ in this period the above $SO_2$ feed rate provides an excess of about 15% of $SO_2$ which is desirable.

In the preferred method according to the invention the slurry is passed from one vessel to another in a series of vessels and sulphur dioxide is passed from vessel to vessel in the series in countercurrent flow to that of the slurry.

Thus the final vessel of the series in relation to the slurry flow has the richest supply of $SO_2$ and also greatest feed rate of this gas. Unreacted $SO_2$ containing a proportion of $CO_2$ released by the reaction in the final vessel is passed to the penultimate vessel in the series and so on until the gas feed into the first vessel contains substantially more $CO_2$ than $SO_2$. Thus the $SO_2$ feed rate is not maintained at a constant rate so far as the slurry in the various vessels is concerned but the overall $SO_2$ feed rate for slurry passing through the entire series of vessels is maintained within the most economical limits as set out above.

At slurry temperatures of 55° to 65° C. calcium reacts with $SO_2$ as well, although formation of soluble calcium bisulphite is somewhat slower than that of magnesium bisulphite. Nevertheless if magnesia is required containing only small proportions of CaO the raw magnesite treated should have a low calcium content. Preferably the magnesite treated according to the invention contains less than 1% of calcium in order to yield a high purity magnesia.

The magnesium bisulphite solution, purified by filtering off the undissolved impurities, may then be treated in order to form a magnesium sulphite hydrate which precipitates and can be recovered for subsequent conversion into refractory grade magnesium oxide. Recovery of magnesium sulphite from the magnesium bisulphite leach solution may be achieved in known manner through simply heating the bisulphite solution, by injecting steam into the leach liquor or by addition of magnesium oxide. The mother liquor, after removal of precipitated magnesium sulphite hydrate, may be recycled for the formation of further slurry.

As stated above the slurry is preferably at a temperature of approximately 55° to 65° C. when contacted with sulphur dioxide. It has been found that at this temperature the best rate of formation of soluble magnesium bisulphite coupled with suitably low dissolution of impurities, such as silica and iron compounds, is achieved. Thus in the operation of the method of the invention the reaction temperature should be maintained close to the preferred reaction temperature by suitable control. The slurry should also be vigorously agitated during the reaction and sulphur dioxide gas should be introduced into the reaction vessel at a constant rate to ensure that an excess of sulphur dioxide is present.

It will be appreciated that the particle size of the magnesite used to form the slurry also has a material effect upon reaction rates. The smaller the particle size the greater will be the rate of reaction. No substantial increase in reaction rates is achieved, however, with particle sizes below about 48 mesh. All of the magnesite should therefore be $-48$ mesh.

EXAMPLE

A slurry was made up containing 80 kgs of raw uncalcined magnesite and 400 kgs of water. The raw magnesite was milled to have a particle size, 100% of which was $-20$ mesh and 95% $-48$ mesh; the analysis of the magnesite being:

| Element | Concentration |
|---|---|
| Mg | 24.0% |
| Ca | 0.48% |
| Al | 0.20% |
| $SiO_2$ | 13.2% |
| Fe | 0.68% |
| Cu | 19 ppm |
| Ni | 400 ppm |
| Mn | 122 ppm |
| B | <10 ppm |

The slurry having a concentration of 200 g/l was introduced into a hot water jacketed vessel equipped with propeller stirrer means and heated to a temperature of 55° C., whereafter $SO_2$ was injected into the vessel by means of a lance at the rate of 1 kg per minute of $SO_2$. The sulphur dioxide feed was continued for a period of 100 minutes during which time the agitator was maintained at a speed of 500 r.p.m.

A second leach was conducted on a similar slurry under the same conditions except that the sulphur dioxide feed rate was maintained at 6 kg per minute.

In both cases, as illustrated by FIG. 2, 85% of the magnesium contained in the slurry was dissolved as magnesium bisulphite, thus increasing the $SO_2$ feed rate from 1 kg per minute to 6 kg per minute was found to have no beneficial effect on the rate of dissolution of the magnesium after 85% of the magnesium had been dissolved.

Over the leach period of 100 minutes 85% of the total charge of 19.2 kg. of magnesium was dissolved providing 16.3 kg of magnesium in solution. At the $SO_2$ feed rate of 1 kg per minute a total of 100 kg of $SO_2$ was introduced into the slurry, of which 86.9 kg was used in the reaction with magnesium to form magnesium bisulphite. The stoichiometric equivalent for the reaction with the total load of magnesium was 102.3 kg of sulphur dioxide and the excess of sulphur dioxide employed was approximately 12.8%.

As will be seen from FIG. 3 the proportion of calcium dissolved in the 100 minute leach period was about 80%, while approximately 25% of the iron and less than 1% of the silica present in the raw magnesite was dissolved.

It will thus be appreciated that on filtration of the solution, recovery of a magnesium sulphite precipitate and calcination thereof in known manner, high grade magnesia product is obtained containing less than 0.77% calcium, 0.2% of $SiO_2$ and 0.4% of Fe.

Many more embodiments of the invention exist which differ in matter of detail only. The essence of the invention resides in the formation of a relatively pure aqueous solution of magnesium bisulphite by reaction of a slurry of uncalcined magnesium containing materials, such as magnesite with sulphur dioxide at elevated temperatures to provide a relatively economical process and a magnesia product containing only small proportions of $SiO_2$.

We claim:

1. A method of recovering magnesia from magnesium carbonate containing raw material contaminated with a substantial amount of silicate, including the steps of forming a slurry of uncalcined magnesium carbonate containing raw material containing between 24.0 and 72.0 g/l of magnesium and contaminated with a substantial amount of silicate, heating the slurry to a temperature between 40° and 90° C., treating the slurry with a stoichiometric equivalent of sulphur dioxide in a period of time between 60 and 200 minutes to form soluble magnesium bisulphite, until the pH level of the magnesium bisulphite solution produced is between 2.0 and 5.0, separating undissolved impurities from the solution of magnesium bisulphite, precipitating magnesium sulphite from the solution, separating the precipitate from the mother liquor and recovering magnesia from the separated precipitate.

2. The method of claim 1 in which the slurry of uncalcined raw material is heated to a temperature in the range 55° to 65° C.

3. The method of claim 1 in which at least most of the raw material is ground to a particle size of −48 mesh prior to formation of the slurry therefrom.

4. The method of claim 1 in which the slurry is formed to contain raw material providing approximately 48.0 g/l of magnesium.

5. The method of claim 1 in which the slurry is treated with sulphur dioxide until the pH level of the magnesium bisulphite solution is approximately 2.5.

6. The method of claim 1 in which the slurry is treated with the stoichiometric equivalent of sulphur dioxide in a period of 100 to 120 minutes.

* * * * *